United States Patent Office 2,774,702
Patented Dec. 18, 1956

2,774,702

LAMINATION OF PERFLUOROCHLOROOLEFINS AND POLYACRYLONITRILE

Richard A. Smith, Cornwall on the Hudson, N. Y., assignor to The M. W. Kellogg Company, Jersey City, N. J., a corporation of Delaware No Drawing. Application December 17, 1953,
Serial No. 398,891

14 Claims. (Cl. 154—139)

This invention relates to the lamination of perfluorochloroolefins and polyacrylonitrile. In one aspect, the invention relates to a process for forming laminated structures comprising solid perfluorochloroolefin polymers bonded to a solid polyacrylonitrile polymer. More particularly in this aspect, the invention relates to a process for forming laminated structures comprising solid trifluorochloroethylene polymers bonded to a solid polyacrylonitrile polymer.

This invention is a continuation-in-part of my prior and copending application Serial No. 394,897 and application Serial No. 394,900, both filed November 27, 1953.

As an accumulative group, perfluorochloroolefin polymers offer wide utility in various industrial applications, serving not only as substitutes for natural rubbers, but in some instances, the various individual synthetics are superior to the natural products; e. g., in oil-resistance, and aging characteristics. In this respect, these polymers, by reason of their fluorine content have been found to be both relatively inert and to possess good physical and chemical stability. One of the most useful polymers in this field of perfluorochloroolefins is the perfluorochloroethylene polymer of trifluorochloroethylene. This particular polymer of trifluorochloroethylene has now been developed to a stage in which it is commercially available and has many useful applications by reason of its chemical inertness, and high physical strength and resilience when in the form of a plastic. However, because of their unusual properties, the perfluorochloroolefin polymers are not susceptible to fabrication into useful products, such as those hereinafter disclosed, by processes which have heretofore been developed for other thermoplastic materials. Particular difficulty has been encountered in attempting to laminate the solid perfluorochloroolefin polymers by processes, heretofore found suitable with respect to other thermoplastics, and have resulted in obtaining a poor bond between the perfluorochloroolefin and the material to which it is sought to laminate these polymers, particularly in the case of forming laminated structures of solid polymers of perfluorochloroolefins and solid polymers of polyacrylonitrile, known by the trade name of Orlon. In no instance, prior to my invention, has a successful process been developed for effecting the formation of firmly bonded laminated structures of solid perfluorochloroolefin polymers (particularly solid polymers of trifluorochloroethylene) with a solid polymer of polyacrylonitrile.

It is, therefore, an object of this invention to provide an improved process for forming laminated structures comprising a solid perfluorochloroolefin polymer bonded to a solid polyacrylonitrile polymer.

Another object of this invention is to provide an improved process for forming a laminated structure comprising a solid trifluorochloroethylene polymer bonded to a solid polyacrylonitrile polymer.

Various other objects and advantages of the present invention will become apparent to those skilled in the art from the accompanying description and disclosure.

The above objects, are accomplished, in general, as more fully hereinafter disclosed, by contacting a solid layer or powdered film of a solid perfluorochloroolefin polymer with a layer or film of a solid polyacrylonitrile polymer, under the conditions hereinafter set forth to form the improved laminated structures of the present invention. The perfluorochloroolefin polymers, which may be laminated by the process of this invention, are the normally solid thermoplastic polymers of perfluorochloroolefins, such as trifluorochloroethylene, 1,1-dichloro, 2,2-difluoroethylene, 1,1,2-trichloromonofluoroethylene and 1,2-dichloro 1,2-difluoroethylene. It is also within the scope of this invention to laminate solid polymers or other chlorinated olefins, such as vinyl chloride, vinylidene chloride, etc., or, in general, any solid thermoplastic polymer of an olefin which contains at least one chlorine atom in the molecule.

The term "polymer," as used above and throughout this description, is intended to include both homopolymers and copolymers. The copolymers which are suitable for bonding to the solid polyacrylonitrile polymers of the present invention, are the normally solid copolymers of perfluorochloroolefins and fluoroethylenes. These copolymers may be either elastomeric or resinous, in characteristics. Particularly useful copolymers of the perfluorochloroethylenes and fluoroethylenes, are trifluorochloroethylene and vinylidene fluoride. Examples of other perfluorochloroethylenes that may be copolymerized with fluoroethylenes, for bonding to the solid polyacrylonitrile polymer, are 1,1-dichloro, 2,2-difluoroethylene, 1,2-dichloro-1,2-difluoroethyelne and trichlorofluoroethylene. Examples of other fluoroethylenes that may be employed with perfluorochloroethylenes to obtain suitable copolymers for bonding to the solid polyacrylonitrile polymer are trifluoroethylene, vinyl fluoride, vinylidene fluoride, 1,2-difluoroethylene and 1,1-fluorochloroethylene. Examples of other halogenated ethylenes that may be employed with perfluorochloroethylenes to obtain suitable copolymers for bonding to the solid polyacrylonitrile polymer are vinyl chloride and vinylidene chloride.

The perfluorochloroolefin component, of the aforementioned copolymers, such as trifluorochloroethylene, may comprise between about 5 and about 95 mol percent of the copolymer. Preferably, however, the perfluorochloroolefin constituent comprises between about 20 and about 80 mol percent of the copolymer, with the remaining major constituent of the copolymer being a fluoroethylene, such as vinylidene fluoride. Particularly useful copolymers are elastic copolymers of trifluorochloroethylene and vinylidene fluoride containing between about 20 and about 69 mol percent of trifluorochloroethylene copolymerized with vinylidene fluoride. Particularly useful resinous copolymers are resinous copolymers of trifluorochloroethyelne and vinylidene fluoride containing more than 69 and less than 80 mol percent trifluorochloroethylene copolymerized with vinylidene fluoride. A more detailed description for the preparation of these particular copolymers will be found in the prior and copending application of Francis J. Honn, Serial No. 332,186, and the prior and copending application of Albert L. Dittman, Herbert J. Passino and Wilber O. Teeters, Serial No. 332,218, both filed January 21, 1953. Further discussion for the manufacture of these copolymers is, therefore, believed to be unnecessary.

In forming the laminated structures of the present invention, a layer of the solid perfluorochloroolefin polymer, such as solid polytrifluorochloroethylene, or a solid copolymer of a perfluorochloroolefin and another halogenated olefin, such as trifluorochloroethylene and vinylidene fluoride, are brought into contact, either in the form of a solid layer or as a powdered film, in a molding press with a layer of a solid polymer of polyacrylonitrile. The molding assembly is held in position above about 5 pounds per square inch gage and at a temperature of at least 135° C., but below the decomposition temperature of the materials which are being laminated. In general, the temperature is maintained between about 140° C. and about 300° C. Temperatures between about 165° C. and about 200° C. are preferred. Pressures substantially in excess of 5 pounds per square inch gage, which are normally employed, may be increased up to about 25,000 pounds per square inch gage, although no particular advantage is found to accrue from the use of such elevated pressures. In normal operation a pressure between about 20 and about 80 pounds per square inch is preferred. The time required to effect bonding or lamination of the two layers is usually between about 0.5 second and about 10 minutes. Preferably, the bonding time employed is between about 10 seconds and about 2 minutes.

The following examples are offered for a better understanding of the present invention and are not to be construed as limiting its scope.

*Example I*

A polytrifluorochloroethylene film, prepared by running trifluorochloroethylene polymer, having a no-strength temperature of 300° C., through a Wiley mill with a 20 mesh screen, was spread in a uniform layer on a 10" x 10" layer of solid high temperature polyacrylonitrile thermoplastic film (Orlon). The two layers were pressed at 475° F., under a pressure of 40 pounds per square inch, for a period of 5 minutes. At the end of that time, the resulting laminate was removed from the press and was found to possess uniform thickness (26±1 mil). The resistance of this laminated structure, employing a 1" circular electrode at 500 volts D. C. was found to be $2 \times 10^7$ megohms. A strong adhesion between the two layers was found to have been produced.

*Example II*

This example is intended to illustrate the formation of polytrifluorochloroethylene films and a film of polyacrylonitrile thermoplastic (Orlon) in which pigmentation is desired in order to avoid the normally black coloration of high temperature polyacrylonitrile thermoplastics.

A mixture containing 1 percent by weight of Ferro Pink F–4869 and trifluorochloroethylene solid polymer, having a no-strength temperature of 325° C. was spread in a uniform layer over a piece of basket-weave black polyacrylonitrile (Orlon). The powdered pigmented trifluorochloroethylene polymer and the polyacrylonitrile film was pressed at 475° F., under a pressure of 40 pounds per square inch, for a period of 6 minutes. At the end of that time, the resulting laminate was removed from the press and was found to possess uniformity in appearance, and the continuous pink appearance of the trifluorochloroethylene yielded a laminated product having a dark purple coloration. The laminated material was found to have a thickness of 28 mils and a resistance of $2 \times 10^7$ megohms. A strong adhesion between the two layers was found to have been produced.

*Example III*

This example is intended to illustrate the formation of opacified polytrifluorochloroethylene films and a film of polyacrylonitrile thermoplastic (Orlon).

A 10 percent concentration of finely divided zirconium silicate (Ultrox) and trifluorochloroethylene thermoplastic powder, having a no-strength temperature of 300° C., was made by mixing these components for 16 hours in a ball mill. This resulting material was then mixed with an appropriate quantity of powdered trifluorochloroethylene thermoplastic, to obtain a mixture containing 1 percent by weight of zirconium silicate. This mixture was then run through a Wiley mill having 20 mesh screen.

The aforementioned 1 percent zirconium silicate-trifluorochloroethylene powdered mixture, was spread in a uniform layer on a 10" x 10" layer of black solid high temperature polyacrylonitrile thermoplastic film (Orlon). The two layers were then pressed at a temperature of 475° F., under a pressure of 40 pounds per square inch, for a period of 5 minutes. At the end of that time, the resulting laminate was removed from the press and was found to possess uniformity of color, film thickness and a pearly-grey appearance, with the weave and the dark coloration of polyacrylonitrile being obscure. The thickness of this laminate was found to be approximately 26 mils and a resistance of $2 \times 10^7$ megohms. Strong adhesion between the two layers was produced.

The laminated structures of the present invention have particular utility in the formation of many useful articles, particularly useful for industrial applications. Among these uses are the manufacture of anti-stick conveyor belts, in conveying or transporting articles that would normally tend to stick or adhere to belts made of polyacrylonitrile itself; diaphragms; various types of gaskets; linings; and also as insulating materials for a wide variety of commercial uses, such as in electrical equipment, including motors and generators.

Since certain changes may be made in carrying out the process of the present invention in producing the desired laminated structures, without departing from the scope of the invention, it is intended that all matter contained in the above description is to be interpreted as illustrative and not in a limiting sense.

I claim:

1. A process for forming a laminated structure which comprises contacting a layer of a solid perfluorochloroolefin polymer with a layer of a solid polyacrylonitrile polymer; and maintaining said layers in contact at a temperature of at least 135° C. but below the decomposition temperature of said laminating materials and at a pressure of at least 5 pounds per square inch gage.

2. A process for forming a laminated structure which comprises contacting a layer of a solid perfluorochloroolefin polymer with a layer of a solid polyacrylonitrile polymer; and maintaining said layers in contact at a temperature between about 140° C. and about 300° C. and at a pressure of at least 5 pounds per square inch gage.

3. A process for forming a laminated structure which comprises contacting a layer of a solid perfluorochloroolefin polymer with a layer of a solid polyacrylonitrile polymer; and maintaining said layers in contact at a temperature between about 165° C. and about 200° C. and at a pressure of at least 5 pounds per square inch gage.

4. A process for forming a laminated structure which comprises contacting a layer of a solid perfluorochloroolefin polymer with a layer of a solid polyacrylonitrile polymer; and maintaining said layers in contact at a temperature between about 165° C. and about 200° C. and at a pressure between about 20 and 80 pounds per square inch gage.

5. A process for forming a laminated structure which comprises contacting a layer of a solid perfluorochloroolefin polymer with a layer of a solid polyacrylonitrile polymer; and maintaining said layers in contact at a temperature between about 140° C. and about 300° C. and at a pressure of at least 5 pounds per square inch gage for a period between about 0.5 second and about 10 minutes.

6. A process for forming a laminated structure which comprises contacting a layer of a solid perfluorochloroolefin polymer with a layer of a solid polyacrylonitrile polymer; and maintaining said layers in contact at a temperature between about 165° C. and about 200° C. and at a pressure between about 20 and about 80 pounds per square inch gage for a period between about 10 seconds and about 2 minutes.

7. A process for forming a laminated structure which comprises contacting a layer of a solid trifluorochloroolefin polymer with a layer of a solid polyacrylonitrile polymer; and maintaining said layers in contact at a temperature of at least 135° C. and at a pressure of at least 5 pounds per square inch gage.

8. A process for forming a laminated structure which comprises contacting a layer of a solid copolymer of trifluorochloroethylene and vinylidene fluoride with a layer of a solid polyacrylonitrile polymer; and maintaining said layers in contact at a temperature of at least 135° C. and at a pressure of at least 5 pounds per square inch gage.

9. A process for forming a laminated structure which comprises contacting a layer of a solid trifluorochloroethylene polymer with a layer of a solid polyacrylonitrile polymer; and maintaining said layers in contact at a temperature between about 165° C. and about 200° C. and at a pressure between about 20 and about 80 pounds per square inch gage.

10. A process for forming a laminated structure which comprises contacting a layer of a solid copolymer of trifluorochloroethylene and vinylidene fluoride with a layer of a solid polyacrylonitrile polymer; and maintaining said layers in contact at a temperature between about 165° C. and about 200° C. and at a pressure between about 20 and about 80 pounds per square inch gage.

11. A laminated structure comprising a layer of a solid copolymer of a perfluorochloroolefin and another halogenated ethylene containing at least one halogen atom selected from the group consisting of chlorine and fluorine bonded to a layer of a solid polyacrylonitrile polymer.

12. A laminated structure comprising a layer of a solid copolymer of trifluorochloroethylene and vinylidene fluoride bonded to a layer of a solid polyacrylonitrile polymer.

13. A laminated structure comprising a layer of a solid copolymer of trifluorochloroethylene and vinyl chloride bonded to a layer of a solid polyacrylonitrile polymer.

14. A laminated structure comprising a layer of a solid copolymer of trifluorochloroethylene and vinyl fluoride bonded to a layer of a solid polyacrylonitrile polymer.

References Cited in the file of this patent

UNITED STATES PATENTS

| | | |
|---|---|---|
| 2,392,388 | Joyce | Jan. 8, 1946 |
| 2,484,483 | Berry | Oct. 11, 1949 |
| 2,484,484 | Berry | Oct. 11, 1949 |
| 2,488,446 | Swiss | Nov. 15, 1949 |
| 2,538,808 | Swiss | Jan. 23, 1951 |
| 2,539,329 | Sanders | Jan. 23, 1951 |

FOREIGN PATENTS

| | | |
|---|---|---|
| 660,398 | Great Britain | Nov. 7, 1951 |